No. 747,372. Patented December 22, 1903.

UNITED STATES PATENT OFFICE.

WILLIAM F. BROWN, OF GOLDTHWAITE, TEXAS.

EGG-PRESERVING COMPOUND.

SPECIFICATION forming part of Letters Patent No. 747,372, dated December 22, 1903.

Application filed August 21, 1903. Serial No. 170,290. (No specimens.)

*To all whom it may concern:*

Be it known that I, WILLIAM F. BROWN, a citizen of the United States, residing at Goldthwaite, in the county of Mills and State of Texas, have invented certain new and useful Improvements in Egg-Preserving Compounds; and I do declare the following to be a full, clear, and exact description of the invention, such as will enable others skilled in the art to which it appertains to make and use the same.

This invention relates to a compound for preserving eggs.

The invention has for its object to provide a compound which when applied to the eggs will form an air-excluding coating adapted to preserve the eggs against deterioration for an indefinite period.

A further object is to provide a preservative coating of this kind which will harden the shell of the egg and decrease the liability of the same being broken in storage or transit and which is not liable to crack or peel from the shell.

In carrying my invention into practice I take of clarified gelatin (Cooper's) one-half ounce; Cox's gelatin, one-half ounce; white gelatin, one ounce, and water (soft) one-half gallon, and thoroughly incorporate the same together in a suitable vessel. This vessel is placed upon a fire and heated until the contents have boiled ten minutes, then taken off, and when the contents have become cooled the said contents are strained through coarse toweling. The strained gelatin solution is then combined with two ounces of water-glass and is then ready for use.

The preservative coating thus prepared may be applied to the eggs by means of a brush, but preferably by submerging the eggs therein for a suitable period to secure a complete coating, after which the eggs are taken out and supported on their points and allowed to drain until the coating is thoroughly dry. The coating will then harden thereon and fill the pores of the shell, thus protecting the same from breakage and at the same time excluding air, so as to protect the egg against deterioration for an indefinite period or until the shell is broken and the contents allowed to become affected by the external atmosphere.

My improved preservative coating is readily and easily made, may be produced at small cost, and is effective for the intended purpose. It is superior to other coatings of its kind in that the gelatin incorporated with the water-glass secures perfect adhesion and prevents the hardened glass from cracking or chipping from the shell of the egg.

I have found in practice that by using the three kinds of gelatin set forth superior results are obtained, as Cooper's and Cox's gelatin when combined form a perfect elastic body which is rendered adhesive by the addition of the ordinary white gelatin.

What I claim is—

1. An egg-preservative compound, composed of water-glass and gelatin.

2. An egg-preservative compound, composed of Cooper's gelatin, Cox's gelatin, white gelatin, combined with water and reduced to a liquid state and incorporated with water-glass.

In testimony whereof I have hereunto set my hand in presence of two subscribing witnesses.

WILLIAM F. BROWN.

Witnesses:
F. M. LONG,
M. C. KIRKPATRICK.